US012643297B2

(12) United States Patent

Mustakangas

(10) Patent No.: US 12,643,297 B2
(45) Date of Patent: Jun. 2, 2026

(54) COMPOSITE ELEMENT AND METHOD OF MANUFACTURING THE SAME

(71) Applicant: Patria Aerostructures Oy, Halli (FI)

(72) Inventor: Mika Mustakangas, Halli (FI)

(73) Assignee: Patria Aerostructures Oy, Halli (FI)

( * ) Notice: Subject to any disclaimer, the term of this patent is extended or adjusted under 35 U.S.C. 154(b) by 0 days.

(21) Appl. No.: 18/910,814

(22) Filed: Oct. 9, 2024

(65) Prior Publication Data

US 2025/0033298 A1 Jan. 30, 2025

Related U.S. Application Data

(62) Division of application No. 16/603,495, filed as application No. PCT/FI2018/050252 on Apr. 6, 2018, now Pat. No. 12,145,715.

(30) Foreign Application Priority Data

Apr. 7, 2017 (FI) ..................................... 20175325

(51) Int. Cl.
| | |
|---|---|
| *B29C 70/34* | (2006.01) |
| *B29C 70/68* | (2006.01) |
| *B64C 1/00* | (2006.01) |
| *B64C 1/06* | (2006.01) |
| *B29K 307/04* | (2006.01) |

(Continued)

(52) U.S. Cl.
CPC .............. *B29C 70/34* (2013.01); *B29C 70/68* (2013.01); *B64C 1/00* (2013.01); *B64C 1/06* (2013.01);

(Continued)

(58) Field of Classification Search
CPC ....... B29C 70/34; B29C 70/68; B29C 70/887; B29C 70/342; B29C 70/42; B64C 1/00; B64C 1/06; B64C 2001/0072; B64C 1/12; B64C 3/18; B64C 3/20; B64C 3/26; B29K 2307/04; B29K 2705/02;
(Continued)

(56) References Cited

U.S. PATENT DOCUMENTS

| | | |
|---|---|---|
| 3,995,081 A | 11/1976 | Fant et al. |
| 4,302,499 A | 11/1981 | Grisch |

(Continued)

FOREIGN PATENT DOCUMENTS

| | | |
|---|---|---|
| EP | 0 235 512 A2 | 9/1987 |
| EP | 1 216 816 A1 | 6/2002 |

(Continued)

OTHER PUBLICATIONS

Muovisanastoa | Muoviteollisuus ry [online] [retrieved Sep. 30, 2022]. Retrieved from the Internet at URL: <https://www.plastics.fi/fin/muovitieto/sanasto/> (Mar. 2017) 18 pages.

(Continued)

*Primary Examiner* — Brian Handville
(74) *Attorney, Agent, or Firm* — Alston & Bird LLP

(57) ABSTRACT

A composite element and a method of manufacturing the same. The composite element comprises a first skin plate and second skin plate, which are manufactured as separate pieces and are assembled in a separate phase. At least the first skin plate comprises several protrusions on an outer surface of the plate. The protrusions serve as local stiffeners and are further stiffened by means of one or more additional composite structures arranged inside the protrusions.

6 Claims, 9 Drawing Sheets

(51) Int. Cl.
*B29K 705/02* (2006.01)
*B29L 31/30* (2006.01)
(52) U.S. Cl.
CPC ...... *B29K 2307/04* (2013.01); *B29K 2705/02* (2013.01); *B29L 2031/3076* (2013.01); *B64C 2001/0072* (2013.01)
(58) Field of Classification Search
CPC ......... B29L 2031/3076; B32B 2250/02; B32B 2250/03; B32B 2260/021; B32B 2260/046; B32B 2262/106; B32B 2307/752; B32B 2419/00; B32B 2605/08; B32B 2605/10; B32B 2605/12; B32B 2605/18; B32B 3/30; B32B 7/08; B32B 3/08; B32B 3/28; B32B 5/26; B32B 7/12; B32B 15/08; B32B 15/14; B32B 15/20; B32B 27/08; Y02T 50/40; E04C 2/322; E04C 2/292; B29D 99/0014; F16S 1/10; F41H 5/0471
See application file for complete search history.

(56) References Cited

U.S. PATENT DOCUMENTS

| 2006/0254250 | A1 | 11/2006 | Dambrine et al. |
| 2008/0010942 | A1 | 1/2008 | Normand et al. |
| 2010/0108246 | A1 | 5/2010 | Sanchez-Brunete Alvarez |
| 2013/0049258 | A1 | 2/2013 | Rotter et al. |
| 2013/0180642 | A1 | 7/2013 | Blot et al. |
| 2013/0180680 | A1 | 7/2013 | Axrup et al. |
| 2013/0313368 | A1 | 11/2013 | Munsen et al. |
| 2015/0292074 | A1 | 10/2015 | Nordin et al. |
| 2016/0346995 | A1 | 12/2016 | Butler et al. |
| 2018/0297300 | A1 | 10/2018 | Tokutomi et al. |

FOREIGN PATENT DOCUMENTS

| EP | 1 481 790 | A2 | 12/2004 |
| EP | 2 128 019 | A2 | 12/2009 |
| EP | 2 764 987 | A1 | 8/2014 |
| FR | 1 251 327 | A | 1/1961 |
| GB | 2 239 837 | A | 7/1991 |
| WO | WO 2008/003733 | A1 | 1/2008 |
| WO | WO 2013/022534 | A2 | 2/2013 |
| WO | WO 2017/043266 | A1 | 3/2017 |

OTHER PUBLICATIONS

U.S. Appl. No. 16/603,495, filed Oct. 7, 2019, U.S. Pat. No. 12,145,715, Patented.

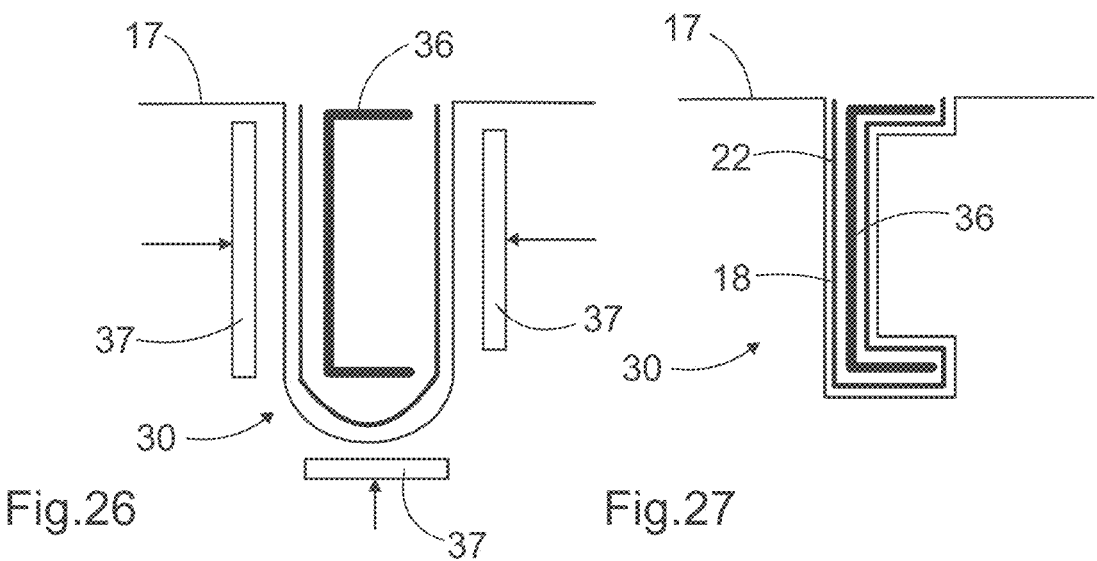
Fig.26
Fig.27
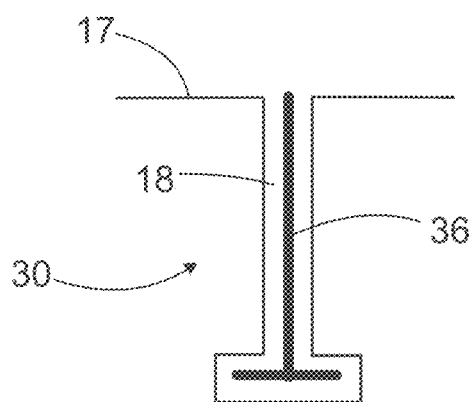
Fig.28
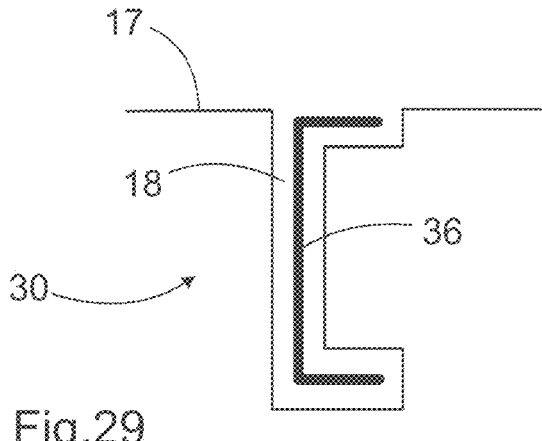
Fig.29

COMPOSITE ELEMENT AND METHOD OF MANUFACTURING THE SAME

CROSS-REFERENCE TO RELATED APPLICATIONS

This application is a divisional of U.S. patent application Ser. No. 16/603,495 filed on Oct. 7, 2019 as a National Stage Application, filed under 35 U.S.C. § 371, of International Application No. PCT/FI2018/050252, filed on Apr. 6, 2018, which claims priority to Finnish Patent Application No. 20175325, filed on Apr. 7, 2017, the contents of each of which are incorporated herein in their entirety.

BACKGROUND OF THE INVENTION

The invention relates to a composite element. The composite element comprises reinforcing fibres and binding material and is provided with several local stiffeners for improving rigidity of the composite element.

Further, the invention relates to a method of manufacturing a composite element comprising several local stiffeners.

The field of the invention is described in more detail in the preambles of the independent claims of the application.

Aircrafts, for example, comprise different load carrying structural elements, which need to be rigid. Therefore, the elements are typically provided with stiffeners for improving their strength properties. Since weight of the structure is often in high importance, structural parts manufactured from composite material are increasingly used in mechanical engineering. In known composite elements, a plurality of separate adjacent reinforcement pieces are fastened by means of adhesive bonding or co-curing on outer surfaces of the structural elements. However, the fastening of the separate fastening pieces is time consuming and the fastening process is vulnerable to many defects.

BRIEF DESCRIPTION OF THE INVENTION

It is an object of this invention to provide a novel and improved composite element. A further object is to provide a new and improved method for manufacturing such composite element.

The composite element according to the invention is characterized by the characterized features of the independent apparatus claim.

The method according to the invention is characterized by the characterized features disclosed in the independent method claim.

An idea of the disclosed solution is that the composite element comprises skin plates and at least one of the skin plates is provided with several directed protrusions on an outer surface of the skin plate. The protrusion serve as local stiffeners for the composite element. In addition to the mentioned protrusions, the skin plate comprises additional composite structures, which are located only at the mentioned protrusions. The additional composite structures are arranged inside the protrusions and are thereby covered by a basic structure of the outer surface of the skin plate. The additional composite structures also serve as local stiffeners and they are directed in accordance with the protrusions. The composite element is assembled by fastening at least two prefabricated composite plates permanently together. Thereby, the structure comprises a first skin plate and a second skin plate, which are both made of composite material. At least the first skin plate is provided with the above mentioned two local stiffener systems, namely the protrusions and the additional first composite structures, which both systems are integrated and inseparable parts of the composite plate.

Further, the first skin plate and the second skin plate are made by utilizing laminating technique. The laminating may be executed manually or by means of a laminating machine. After the basic composite of the skin plate is being laminated, then the additional first composite structures may be laminated on the inner surface of the first skin plate at the designed positions of the protrusions to be formed. Thereafter, the basic composite structure of the first skin plate and the first additional composite structure attached on an inner surface of the first skin plate are being bulged together for forming the several stiffened protrusions.

An advantage of the disclosed solution is that the additional composite structure may be formed on the prefabricated first skin plate during the manufacturing process so that there exists no longer need for fastening large amount of separate stiffening parts during the assembly of the composite element. This way the manufacturing process may be quickened and the assembly of the composite element may be easier. Further, the disclosed solution suits well for automated production techniques.

From the point of view of the strength theory, it is advantageous when the stiffeners are integrated inseparable parts of the skin plate and are located inside the protrusions. The additional composite structures arranged inside the protrusions increase considerably rigidity of the protrusions. Thanks to the integrated structure, discontinuities between the separate components may be avoided. When the local stiffeners are integrated to the basic structure already at the manufacture of the component, it may also be possible to reduce weight of the composite element. Further, the inner stiffeners are protected by the basic structure of the composite element against wear, impacts and moisture, for example, whereby the disclosed structure may improve durability of the composite element.

The composite structure of the first skin plate and the second skin plate are made of composite material comprising at least one binding or matrix material, which may be epoxy resin, for example. Further, the composite material comprises reinforcing material, such as reinforcement fibres, fibre assemblies or fabrics made of reinforcement fibres. The reinforcing material may comprise carbon fibres, for example. By means of the used materials, fibre orientation and number of laminated layers strength properties of element made of composite material may be influenced.

According to an embodiment, the composite element is an aircraft component. Thus, the composite element may be a planar and curved element, such as flange, panel or wall element of an airplane. In aircrafts light weight and rigid structure is in high importance.

According to an embodiment, each of the protrusions have elongated fold-like configurations on the outer surface side of the first skin plate. The additional first composite structures are located between folded layers of the basic composite structures of the protrusions. Then, the additional first composite structures form inner material layers between the layers of the folded basic composite structures.

According to an embodiment, each of the additional first composite structures inside the protrusions comprise two composite material layers being folded against each other. Thus, the folded additional first composite structures have a double layer structure. The first composite structure may be laminated initially as a planar material layer on the inner surface of the first skin plate and may be bulged together with the basic composite structure of the first skin plate towards the outer surface side. Surfaces of the additional first composite structure layer may be set against each other during the bulging process, or alternatively, the formed protrusion is shaped after the bulging by compressing it with press tools.

According to an embodiment, the additional first composite structures form central stiffeners inside the protrusions. Then, the protrusions and the additional first composite structures protrude transversally relative to the outer surface of the first skin plate. The additional first composite structure forming an inner stiffener may have a shape resembling a letter I. The I-shaped central stiffener may be formed by the bulging technique as disclosed in the previous embodiment, or alternatively the stiffener may be a separate insert piece arranged centrally inside the protrusion.

According to an embodiment, the protrusions and the inner stiffeners inside them comprise one or more transversal portions having direction transversal relative to central axis of the protrusions. By means of the transversal portions the basic composite structure of the skin plate and the first additional composite structure may be shaped according to the need. The protrusions and the inner stiffeners may be shaped to resemble shapes of letters, L, an inverted L, T, an inverted T and C, for example. The transversal portions may be formed by bending the protrusion and the inner stiffener at desired one or more locations in order to provide them with desired cross sectional shapes. As an alternative to the mentioned bending technique, the protrusion may be equipped with a reinforcing profile element comprising one or more transversal portions. Then the basic composite structure is shaped in accordance with the profile of the inserted profile element.

According to an embodiment, inside the protrusions are located prefabricated composite profile elements, which serve as the mentioned additional first composite material structures. The composite profile elements may be separately manufactured elongated pieces, which are arranged inside the protrusions, whereby they form the local inner stiffeners. The composite profile elements are enveloped at least by the basic composite structure of the first skin plate. An advantage of use of the composite profile elements is that the shape of the profile elements may be selected versatility, and further, material and structure of the profile elements may be selected relatively freely. An additional advantage is that the separate composite element may be a relatively rigid piece and it may aid the shaping process of the protrusion.

According to an embodiment, inside the protrusions are located prefabricated composite profile elements which are enveloped by second additional first composite structures. In this embodiment the profile element and the enclosing layers of the second additional first composite structure form together the integrated inner stiffener for the protrusion. In other words, the protrusions are provided with stiffening profile elements and stiffening composite material layers arranged around the profile elements. The basic composite structure of the skin plate and the enveloping stiffening material layer are both shaped at the protrusion in accordance with the shape of the profile element. An advantage of this embodiment is that, the inserted composite profile and the surrounding additional composite layer may be made of different binding and reinforcing materials and they may have differing fiber orientations thereby allowing desired combination of strength, stiffness, elongation or other mechanical design criteria or operational behavior or feature properties to be achieved. Further, the profile element arranged inside the protrusion may assist the shaping of the basic composite structure and the additional first composite structure and may thereby improve quality and productivity of the manufacture. Further, the use of the inner profile element may facilitate formation of complicate stiffening profiles.

According to an embodiment, each of the protrusions comprise at least one stiffening composite layer on their inner surfaces. The basic composite structure of the protrusion and the stiffening additional composite layer form together a shell inside which is a space. The space may be empty or it may be filled with suitable light-weight filler material. The space may be filled with foam material, for example. In other words, the space defined by the protrusion and the stiffening layer may be completely hollow, or at least it is free of composite material and stiffening structures made of composite material. Cross-sectional shape of the protrusion and the stiffening inner layer structure may be selected relative freely, whereby their profile may have curved, semicircle or angular shapes.

According to an embodiment, at least the first skin plate is made of thermoplastic or thermoset material. Thereby, the skin plate may be shaped under elevated temperature. The basic composite material of the first skin plate may bulged to the outer surface side at the protrusions by means of thermoforming. The second skin plate may be made of the same or different thermoplastic or thermoset material as the first skin plate. The protrusions may be formed to the skin plates by bulging the basic composite structure and the possible stiffening layer on inner surface of the skin plate to the outer surface side under elevated temperature. The shaped and locally stiffened components i.e. prefabricated elements are still in formable condition and they may be further shaped before assembly or even during the assembly of the composite element. The assembled structure may be cured by means of oven, autoclave or room temperature cure with or without vacuum bagging depending of material system, for example.

According to an embodiment, the above discussed protrusions and stiffening additional layers arranged at the protrusions may be bulged to the outer surface side of the skin plate by means of a mold arrangement. The mold arrangement may comprise several mold elements on which a blank of the skin plate is arranged. Between the mold elements are gaps and the mold elements may be moved towards each other in order to shorten lengths of the initial gaps. The skin plate may be heated by a heating device. Further, the skin plate may be connected to the mold elements for ensuring that it moves together with the mold elements. The connection may be formed by vacuum means, for example. When the mold elements are moved towards each other, the skin plate, the temperature of which has been raised, will protrude or bulge to the gaps forming thereby the desired protrusions.

According to an embodiment, the second skin plate comprises several additional local second composite structures at the protrusions of the first skin plate. Thus, also the second skin plate is provided with local stiffeners at the protrusions. The stiffeners may be arranged inside the basic structure of the second skin plate. Alternatively, the local stiffeners are located on the inner surface of the second skin plate and are thereby against the inner surface of the first skin plate. The stiffeners of the second skin plate have positive impact on strength properties of the protrusions. When the composite element comprises one or more intermediate plates between the skin plates, then the additional local stiffeners are arranged at least to a plate being closest to the first skin plate. The additional second composite structure arranged on the surface of the plate may consist of desired number of laminated composite layers. And further, the additional second composite structure arranged inside the basic structure may consist of one or more separate insert pieces, which may be made of composite material, for example.

According to an embodiment, the second skin plate or the intermediate plate closest to the first skin plate comprises the above disclosed local stiffeners on the surface arranged against the first skin plate. Further, the additional second composite structures on the inner surface of the second skin plate are being connected to the inner stiffeners of the protrusions of the first skin plate when the composite element is assembled, whereby they form together an integrated inner stiffener. The combined inner stiffener may have shapes resembling inverted letters T and L. Thus, the shape of the combined inner stiffener may depend on the relative positions of the local stiffeners of the skin plates.

According to an embodiment, between the skin plates are one, two or even more intermediate plate-like elements. The intermediate plates may be laminated composite structures, for example. By means of the intermediate plates, thickness of the composite element may be increased when needed.

According to an embodiment, the outer surface of the second skin plate is smooth. Thus, the second skin plate is without protrusions or grooves. This embodiment is especially suitable when one of the outer surfaces of the composite element needs to be smooth. The smooth or planar surface of the second skin plate is also advantageous when the composite element is mounted against a third skin plate or surface to be stiffened.

According to an embodiment, the outer surface of the second skin plate is provided with protrusions. The protrusions may be similar as in the first skin plate, or they may differ in dimensions and shapes. Also number of the protrusions and their spacing and orientation may be similar or different as in the first skin plate. Further, the protrusions of the second skin plate may be formed in the same way as the protrusions of the first skin plate. The protrusions of the second skin plate may be stiffened by means of local inner stiffeners. The stiffeners may be formed by using the same techniques as the stiffeners of the first skin plate and also the disclosed structural features may be applied. However, the local inner stiffeners of the first skin plate and local inner stiffeners of the second skin plate may be similar or may differ from each other. Thus, there are several alternatives to influence to strength properties of the final composite element.

According to an embodiment, the skin plates are planar elements. The skin plates may be laminated on a planar surface. Thereby, the assembled composite element has also planar configuration. The planar composite element may be used as control surfaces, structural elements, floor elements and wall elements, for example.

According to an embodiment, the skin plates are curved elements. The first skin plate and the second skin plate may be laminated on a curved surface by means of the laminating technology. Alternatively, the skin plates are at first laminated on a planar surface and are shaped into curved pieces after the lamination process. The skin plates may be shaped in a separate bending step before assembly, or alternatively, simultaneously during the assembly of the composite element. The shaping may be carried out under elevated temperature and using mechanical or vacuum pressing. The assembled composite element has curved configuration and may be utilized as a fuselage element, for example.

According to an embodiment, the composed structure is cured by means of vacuum bagging technique, whereby the curing exists under elevated temperature and vacuum. By means of the vacuum, mechanical pressure is created on the assembled composite element to compress the structure of composite element.

According to an embodiment, the composed structure is cured by means of a pressing and heating device. Then the curing exists under elevated temperature and mechanical pressing force is directed to the assembled pieces by the pressing device.

According to an embodiment, fastening of the disclosed stiffened first skin plate is executed by two different fastening systems. In addition to the adhesive bonding against the second skin plate or basic structure mechanical fastening may be utilized to combine the structure. The mechanical fastening may comprise several rivets, screws or corresponding fastening elements. The aim of the mechanical fastening may be to keep the fastened components pressed against each other and immobile relative to each other until the adhesive material is cured. On the other hand, the mechanical fasteners may act as additional securing elements for the adhesive joint and may thereby prevent peeling of the first skin plate in case the adhesive joint fails. However, typically the adhesive bond alone is designed to carry the loads between the connected plates.

According to an embodiment, the method comprises forming bulges on an outer surface side of the first skin plate and compressing the bulged protrusions in the transverse direction so that the bulges are flattened and void volumes inside the protrusions are eliminated. An inner surface of the first skin plate comprises laminated composite layers, which form an additional first composite structure and which are bulged together with the basic composite structure. The additional composite layers are folded during the bulging and are pressed against each other when the bulges are transversally compressed. Then each of the protrusions comprise central inner stiffeners with double-wall structure between the basic composite structures of the protrusions. Cross sectional shape of the formed protrusions may resemble letter I after the bulging and compression procedures. However, the cross sectional shape of the protrusions may be shaped after the bulging and compressing by means of bending, or alternatively, the bulging and compressing steps may be configured to provide the protrusions and the inner stiffeners with one or more transversal or bent portions.

According to an embodiment, the method comprises forming at least one bend to at least some of the protrusions of the first skin plate after being formed by means of the bulging. The shaping of the protrusions is executed by bending the protrusions under elevated temperature by means of at least one bending tool.

According to an embodiment, the method comprises forming at least one bend to at least some of the protrusions of the first skin plate during the bulging process of the protrusions. Then mold elements used in the bulging process are arranged to generate the transversal bent portions.

According to an embodiment, the method comprises bending outermost parts of at least some of the protrusions of the first skin plate into opposite direction, whereby the structures of the protrusions are bend against themselves at their outermost ends. Bending angle may then be substantially 180° relative to central axis of the protrusions. After the bending the protrusions comprise bulbs or enlargements with double-structures at their ends. In other words, an end surface of the protrusion is directed towards the outer surface of the first skin plate after being bent. The basic composite structure of the protrusion and the inner stiffener inside the protrusion are both bent simultaneously, of course.

According to an embodiment, the method comprises bending outermost parts of at least some of the protrusions of the first skin plate into transverse direction relative to central axis of the protrusions, whereby the protrusions are provided with transverse portions at their outermost ends. Bending angle may then be substantially 90° relative to central axis of the protrusions. Thus, the shape of the protrusion and the inner stiffener inside the protrusion may resemble an inverted letter L. When such inner stiffener having the shape of the inverted letter L is combined with an additional local stiffener arranged on the second skin plate at the protrusion, then the stiffeners may form together an inner stiffener the shape of which may resemble letter C. It is to be noted that the bending angle may differ from the mentioned 90° and may alternatively be 45-135°, for example.

According to an embodiment, the structure of the first skin element comprises prefabricated composite profiles at the protrusions. The composite profiles may be used as template pieces for the shaping process of the protrusions and possible other inner stiffeners. The composite profile may be a relatively rigid piece, whereby the shaping of the basic structure of the first skin plate and the additional first composite structure is facilitated. The use of the template piece allows use of simple expandable pressing tools, such as an expandable pneumatic bellows. The composite profile may be formed by pultrusion process and may be cured simultaneously so that the profile is rigid.

According to an embodiment, the additional second composite structure and the basic composite structure of the skin plate have different structures. Orientation of reinforcing fibers, material of the reinforcement fibers and material of the binding material may be different in the additional second composite structure as compared to the basic structure. Combination of the different structures and materials may provide the element with different stiffening properties. The structure of the additional second composite structure may be optimized freely according to the need.

According to an embodiment, two or more disclosed composite elements may be connected to each other in order to form desired larger stiffening fields or components. Then several successive composite elements may be mounted longitudinally or transversally to each other. The mounting may be executed by using known fastening means.

According to an embodiment, the second skin plate of the disclosed composite element is configured to be fastened permanently against a third skin plate, surface or structure, which is made other material than composite material. The second skin layer may be designed to serve as a transition zone compensating different heat expansions of the third surface and the first skin plate. When the first skin plate is reinforced by means of carbon fibers and the third skin plate or surface is made of aluminum alloy, for example, a great difference exists in their material heat expansions. Reinforcing materials and fiber orientation of the second skin plate may be selected in accordance with material properties of the third skin plate or surface so that the second composite layer is capable to act as a compensating layer. Alternatively, or in addition to, the second composite layer may form an insulating layer between the first skin plate and a metallic third skin plate or surface. In other words, the second skin plate may prevent electrochemical corrosion between the first skin plate comprising carbon fiber reinforcements and the metallic third structure. Then the structure and materials of the intermediate second skin plate may be selected by taking this insulating feature in to account. The second skin plate may also protect the first skin plate from moisture conveyed from a porous third plate, such as from a plate comprising wood. Thus, the second skin plate may serve not only as stiffening structure, but it may also be designed to solve other recognized technical problems occurring in multi-material structures.

According to an embodiment, the disclosed composite element is connected to a basic structure comprising one or more metallic plates. Then the second skin plate of the composite element may be fastened against the basic structure, which may be a third skin plate and may be of aluminum alloy or any other light-weight metal material. By means of the composite element, provided with the local stiffeners, strength properties of the basic structure may be improved, as well as stiffness, elongation or other mechanical design criteria or operational behavior. When composite and metal structures are combined, advantageous properties of both materials may be utilized. The composite element may be joined via the second skin plate to the metallic skin plate or basic structure by means of an adhesive layer or resin film, for example. Further, between the second skin plate and the basic structure may be one or more intermediate plates, which may be made of composite or metallic material. The formed structure may be called a hybrid or multi-material element.

According to an embodiment, the stiffened composite element is fastened to the metallic skin or basic plate as is disclosed in the previous embodiment. Further, the composite element is designed to prevent instable behavior under loading, like buckling, of the metallic skin or basic plate. In other words, the purpose of the composite element is to improve stability of the metallic plate, which may be dimensioned to be thinner and lighter as without the stiffening structure fastened to it. Orientation of the local stiffeners of the first skin plate may be directed in order to improve the structural stability. Since the first skin plate may prevent the buckling i.e. sudden sideway deflections and deformations of the structure, the structure may be rigid and light weight. Further, behavior of the element under loading is predictable. The disclosed embodiment suits well for light weight structures having relatively large surface areas. Thus, the structure may be applied in mobile machines and transport means.

In addition to the aircrafts, the above disclosed structures with the stiffened first skin plate may be utilized in different components of vehicles, trains and vessels. Light weight and still rigid structure allow greater load carrying capacity and payload, for example, which may lower life cycle costs.

In an automobile the disclosed composite element may be a bonnet element, roof element, door element or floor element, or other structural BIW (Body-In-White) element, for example. Further, selected parts of the body work of the automobile may also be stiffened in the disclosed manner. The automobile element may comprise the above disclosed metallic basic plate being stiffened against buckling with the stiffened composite element integrated to the thin metallic plate. In practice, the second skin plate may be fastened against a surface of the metallic plate by means of an adhesive joint, or combined with mechanical fastening to support adhesive joint during cure and act as a fail-safe connector in operational usage. In busses, trucks, trains, ships and boats the same concept may be use for side elements, lids, decks, masts and corresponding elements.

Furthermore, the above disclosed stiffened composite structures may also be utilized in general mechanical engineering. Thereby it is possible to stiffen different kinds of beam elements, bars, booms, columns, skin structures and lids by means of the composite element provided with the disclosed local stiffeners.

According to an embodiment, the disclosed composite element is fastened on a surface of an elongated beam structure. The beam may be hollow, whereby cross-section of the beam comprises one or more inner surfaces and one or more outer surfaces. One or more of these surfaces may be provided with the disclosed composite elements comprising the first and second skin plates which are fastened together. Then, an outer surface of the second skin plate is fastened against the surface of the beam.

According to an embodiment, disclosed composite element is fastened on a surface of an elongated boom or boom part. The boom may be part of a mobile machine such as an excavator, mobile crane or forest machine etc. The boom may be made of aluminum, aluminum alloy, steel or steel alloy. Cross-section of the boom is hollow and it may have a rectangular hollow shape. Then one or more composite elements comprising the first skin plate and the second skin plate may be mounted on one or more surfaces of the boom. Moreover, dimensions, orientation of the reinforcements and other adjustable features may be selected for each wall independently. The disclosed composite stiffeners may be designed to match and to be arranged to cover only desired limited areas or portions of the walls of the beam or boom, for example due to weight or strength optimization or due to space limitations within boom structure due to space required by operational features like a telescopic system. When the composite stiffeners are mounted against inner surfaces of the boom, then the stiffeners are protected against external forces and damages by the base structure of the boom, and further, the composite stiffening elements are also protected against environmental conditions, such as humidity and UV-radiation.

Properties of the basic beam or boom may be tailored to withstand specific use and loadings by mounting the disclosed composite stiffeners on desired position of them. It is for example possible to provide the profile with the composite stiffeners only at selected longitudinal sections as well as to stiffen only desired wall sections of the profile. The same basic profile may be used as a starting point for different end products because the varying stiffness properties may be tailored by means of the composite stiffening elements fastened to the surfaces of the basic profile.

The composite stiffener comprising the bonded first and second skin plates are fastened against the surface to be stiffened by means of gluing or bonding agent. However, the fastening may additionally comprise one or more mechanical fastening elements to support adhesive joint during cure and to act as fail safe connector in operational usage.

The above disclosed stiffened composite element comprising bonded first and second skin plates may also be used to stiffen structures which are made of natural wood base fiber material, such as plywood. This is another example of a hybrid or multi-material structure.

According to an embodiment a building or construction component or structure comprising at least one surface is stiffened by means of the disclosed composite element. Then, at least one prefabricated and hardened composite stiffening element is bonded on the at least one surface of the building component, which is made of material other than the composite stiffening element. The composite stiffening element comprises a first and second skin plate connected to each other. The first skin plate is provided with several protrusions on an outer surface of the first skin plate for providing it with local stiffeners, and wherein the first skin plate is bulged at the protrusions. The outer surface of the second skin plate is fastened permanently against the outer surface of the building component.

The building or construction component or structure may be made of material comprising natural fibers, such as wood fibers. Thus, the component may be formed of cross laminated timber (CLT), which consists of layers of timber planks glued and pressed together at right angles, or alternatively the component may be formed of laminated veneer lumber (LVL) or conventional veneer, or formable veneer made from layered structure of thermoset, thermoplastic or elastic adhesion layers and wooden veneer plies which can be either in 2D or 3D shaped. However, it is also possible to strengthen relatively thin metallic building or construction panels and facade plates. Thus, the disclosed composite stiffening elements may form together with different basic building components a hybrid or multi-material structure intended to be used in construction industry.

BRIEF DESCRIPTION OF THE FIGURES

Some embodiments of the invention will be explained in greater detail in the attached drawings, in which FIGS. 26 and 27 are schematic views of a protrusion provided with a composite profile element having C-shape, FIGS. 28 and 29 are schematic views of protrusions provided with inserted profile elements which only serve as inner stiffeners for the protrusions.

In the figures, some embodiments of the invention are shown simplified for the sake of clarity. Like reference numerals refer to like parts in the figures.

DETAILED DESCRIPTION OF SOME EMBODIMENTS OF THE INVENTION

Figure 1:
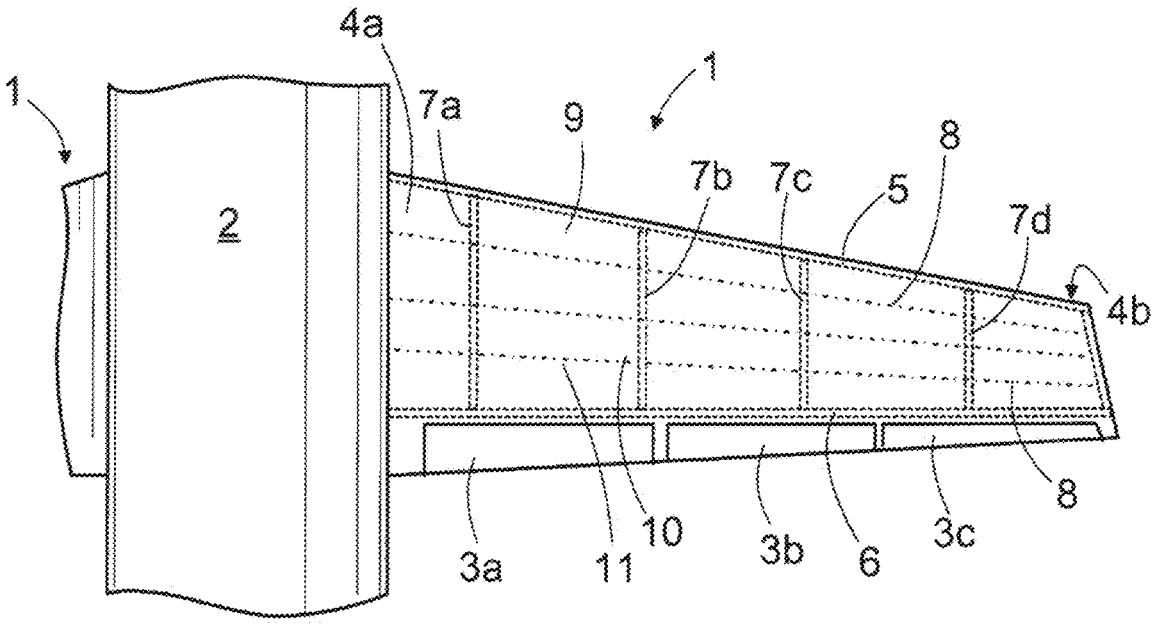
FIG. 1 shows schematically part of an aircraft, the structure of which may comprise the disclosed planar and curved composite elements.

FIG. 1 shows a wing 1 that is fastened to a fuselage 2 of an aircraft. A trailing edge of the wing may comprise movable control surfaces 3a to 3c. The wing 1 may comprise an upper skin plate 4a and a lower skin plate 4b, between which is arranged a support structure for the wing that may comprise a front spar 5, rear spar 6, wing ribs 7 and stringers 8. The composite element disclosed in this patent application may be utilized as a load carrying structural component in the wing 1 or the fuselage 2. The composite element may then be part of the control surfaces 3a-3c, part of the support structure of the wing 1 or part of the fuselage 2.

Figure 2:
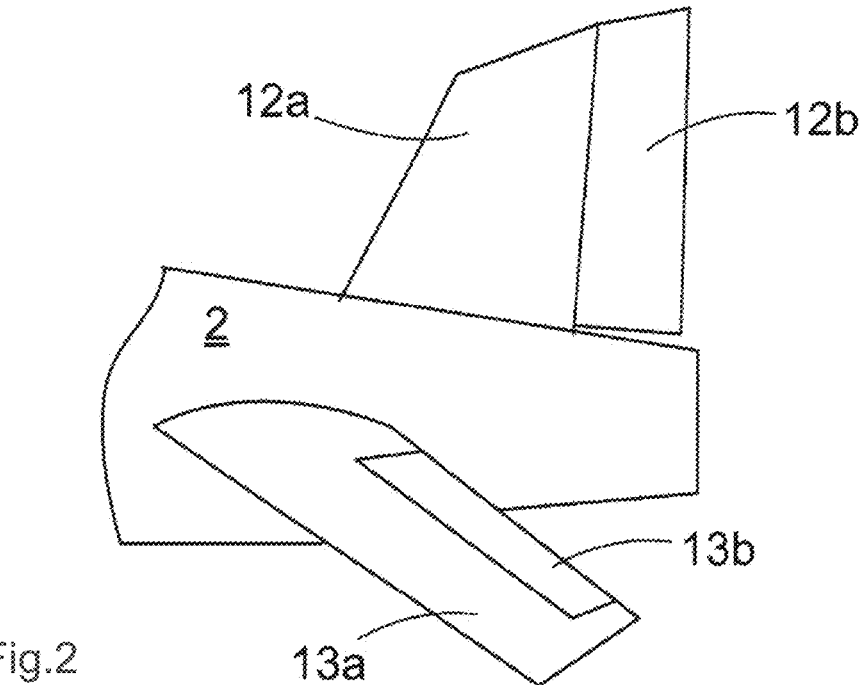
FIG. 2 shows schematically a tail of an aircraft, the structure of which tail may comprise the disclosed composite elements.

FIG. 2 shows a tail of an airplane and comprises fixed stabilizers 12a and 13a, and movable control surfaces 12b, 13b. Support structures of the tail, stabilizers and the control surfaces may comprise composite elements disclosed in this patent application.

Figures 3, 4, 5, 6:
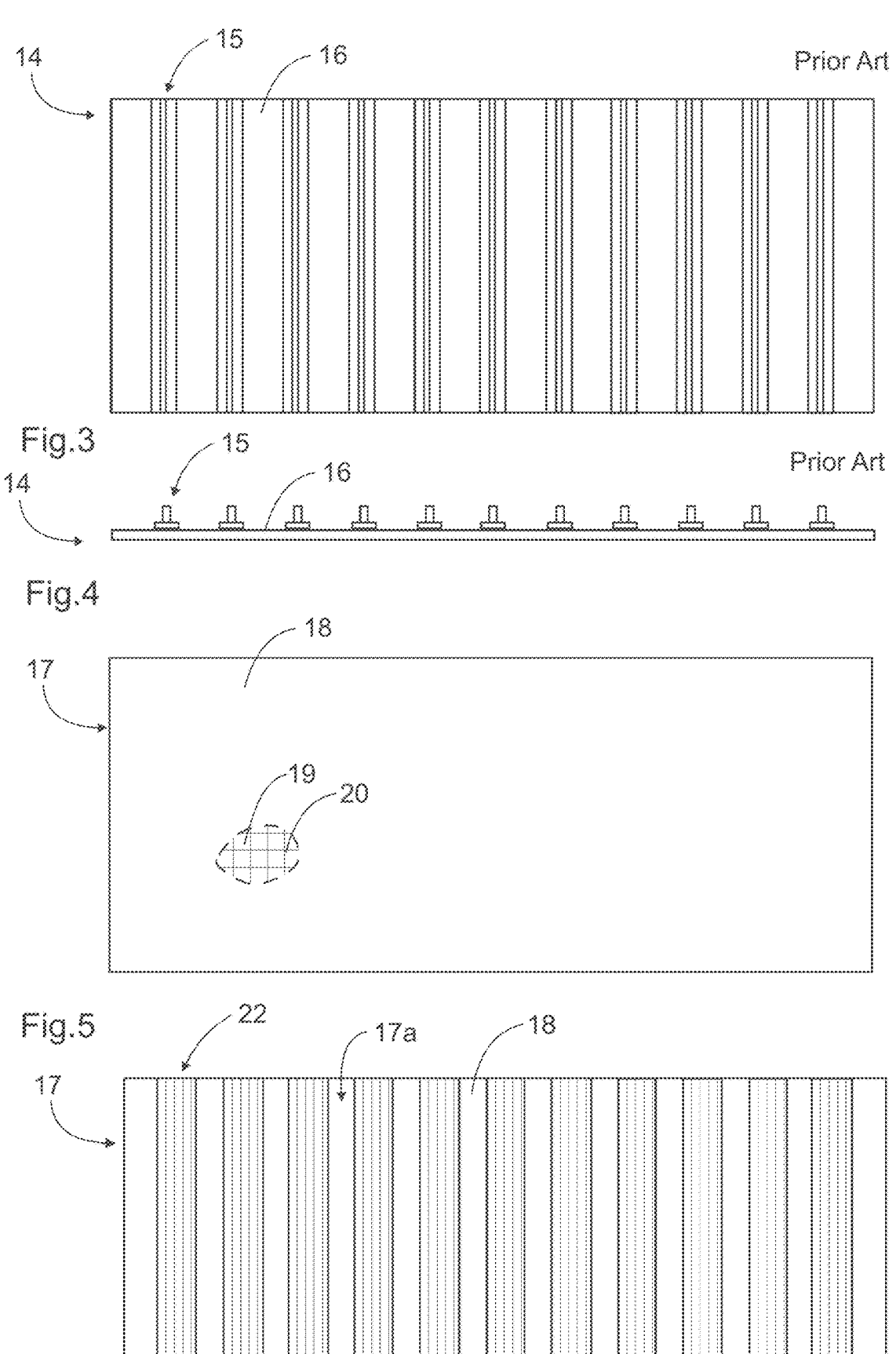
FIGS. 3 and 4 show schematically a top view and a side view of a prior art composite element comprising several separate stiffening components fastened on its outer surface.
FIG. 5 is a schematic top view of an inner surface of a first skin plate of a composite element after its basic composite structure has been laminated.
FIG. 6 shows the inner surface after additional first composite layers have been laminated at positions of protrusions which are to be formed.

FIGS. 3 and 4 show a prior art composite element 14 which comprises several separate stiffening components 15 fastened on its outer surface 16. The stiffening components 16 may be cured components which are adhesive bonded on a cured composite element in order to form local stiffeners for the composite element 14.

It should be noted that the following FIGS. 5-29 of this patent application are strongly simplified presentations of the disclosed solution and are simplified for improving clarity.

FIG. 5 discloses a first skin plate 17 of the disclosed solution. The skin plate 17 may be a substantially rectangular piece made of composite material. Basic composite structure 18 of the skin plate may be laminated and it may comprise one or more binding material 19 and one or more reinforcing material 20.

FIG. 6 shows that on an inner surface 17a of the first skin plate 17 may be laminated several additional first composite layers or structures 22. The additional composite structures 22 have elongated configuration and their direction may be transverse to longitudinal direction of the composite element. The additional first composite structures 22 have been laminated only at positions of protrusions which are to be formed for the first skin plate 17 in following manufacturing phases. Thereby, between the parallel first composite structures 22 are portions where the basic composite structure 18 forms the outermost surface. The additional first composite structure 22 may comprise different fibre orientation compared to the basic composite structure 18. In FIG. 6 the first additional composite structure 22 comprises only longitudinal reinforcing fibres.

Figures 7, 8, 9, 10, 11:
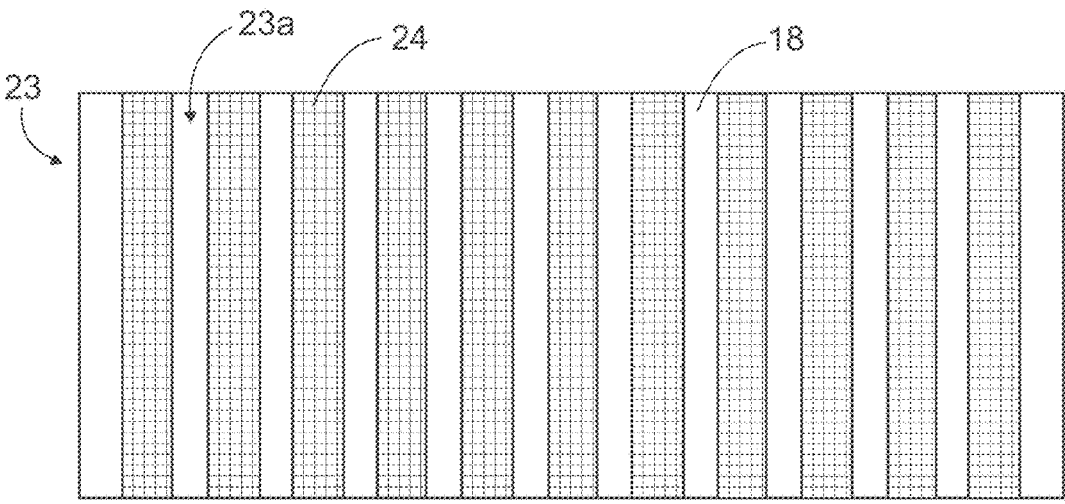
FIG. 7 is a schematic top view of an inner surface of a second skin plate of the composite element after being provided with additional second composite layers at positions of protrusions of the first skin plate.
FIG. 8 is a schematic view of a detail showing a principle of bulging process and forming protrusions by means of movable mould elements.
FIG. 9 is a schematic view of a detail showing compressing phase, wherein the bulge of FIG. 8 is compressed in transverse direction by means of pressing tools.
FIG. 10 is a schematic side view of a first skin plate after several protrusions have been formed on its outer surface side by means of bulging.
FIG. 11 is a schematic side view of a first skin plate after the bulged protrusions have been compacted.

FIG. 7 shows a second skin plate 23 the shape of which corresponds to the shape of the first skin plate 17, and which may also be formed by laminating technique. On an inner surface 23a of the second skin plate 23 may be laminated several parallel additional second composite layers or structures 24 at positions of protrusions of the first skin plate 17. Width, positioning relative to the protrusions and structure of the additional second composite structures 24 may be selected case by case.

FIG. 8 discloses in a simplified manner one possible principle of creating protrusions for the skin plate. The first skin plate 17 according to FIG. 6 is positioned on a mould arrangement 25 so that an outer surface of the skin plate is facing against the mould arrangement 25. The first skin plate 17 is fastened immovably to movable mould elements 26a, 26b of the mould arrangement 25. The fastening may be based on vacuum or the first skin plate 17 may be pressed by means of mechanical fastening elements 27. Initially there is a gap 28 between the mould elements 26a, 26b and when the mould elements 26a, 26b are moved towards each other to degrease the gap 28, then the first skin plate is being bulged to the outer surface side at the gap 28. During the bulging the first skin plate 17 is heated by means of a heating device 29. The bulged portion of the skin plate 17 forms then a protrusion 30, wherein the basic composite material 18 as well as the additional first composite structure 22 are both being bulged.

FIG. 9 shows that the formed bulged portion or protrusion 30 may be compressed by pressing it transversally by means of pressing tools 31 under an elevated temperature. This way the protrusion 30 may be further shaped after the bulging process. The protrusion 30 may be compressed so that no void volume is left inside it and inner surfaces of the additional first composite structure 22 are pressed against each other.

In FIG. 10 the first skin plate is disclosed after the bulging process and in FIG. 11 after the bulges have been compressed.

Figures 12, 13, 14:
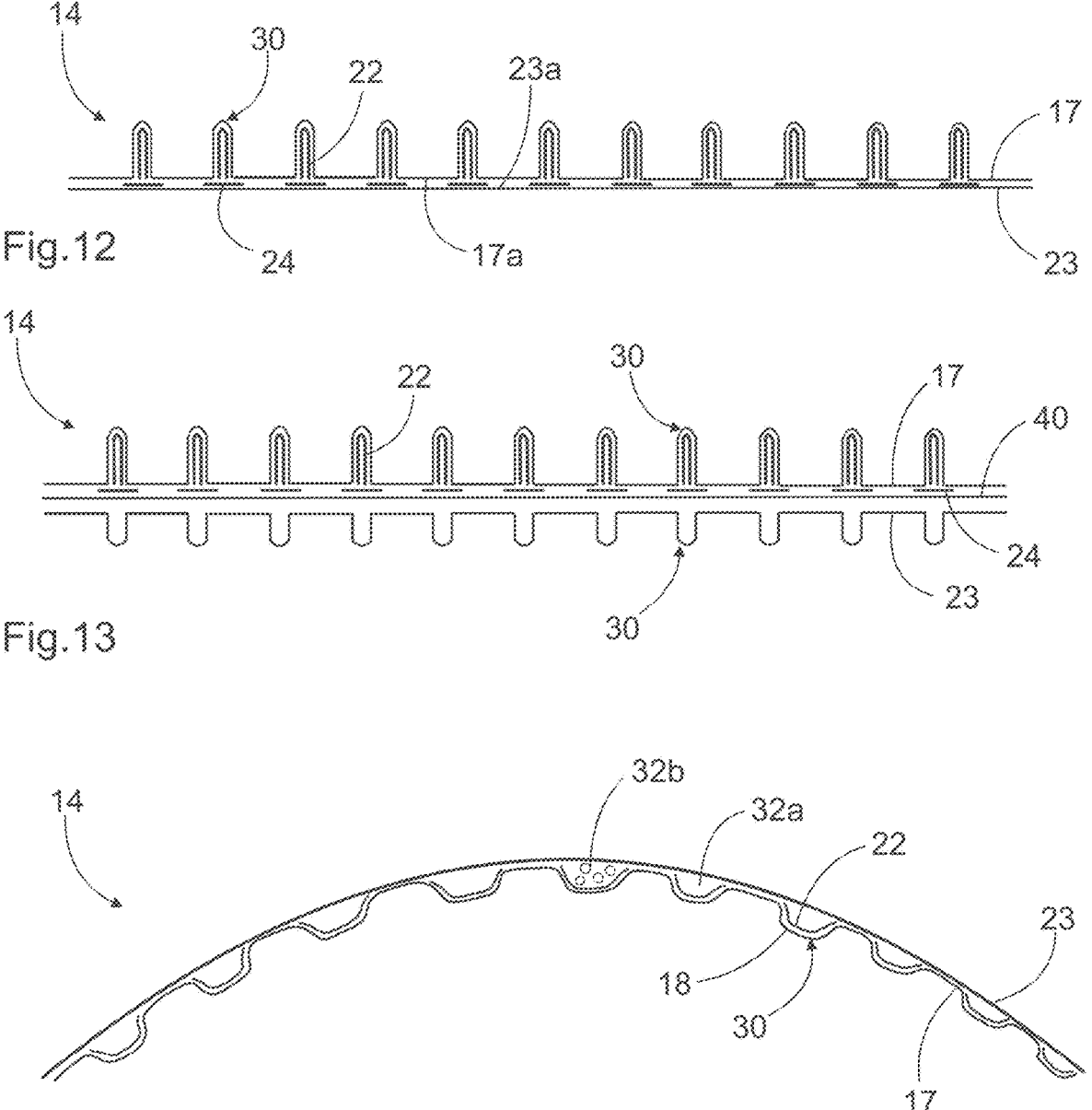
FIG. 12 is a schematic side view of a composite element comprising a first skin plate with protrusions and a second skin plate with an even outer surface.
FIG. 13 is a schematic side view of a composite element comprising a first skin plate and a second skin plate both comprising protrusions and an intermediate plate between the skin plates.
FIG. 14 is a schematic view of a curved fuselage component comprising hollow or foam filled protrusions.

FIG. 12 discloses an assembled composite element 14 comprising a first skin plate 17 with protrusions 30 and a second skin plate 23 with an even outer surface. The inner surfaces 17a, 23a of the skin plates are fastened permanently against each other. At the protrusions 30 are located additional second composite structures 24 of the second skin plate 23. The additional second composite structures 24 may support the folded first composite structures 22 inside the protrusions 30. The additional composite structures 22, 24 may be fastened to each other and may then form combined inner stiffeners. In FIG. 12 the outer surface of the second skin plate 23 is even.

FIG. 13 shows an alternative for the solution of FIG. 12. The composite element 14 may comprise a first skin plate 17 and a second skin plate 23 both comprising protrusions, and further, one or more intermediate plates 40 may be arranged between the skin plates 17, 23. The intermediate plate 40 may comprise second composite structures 24 for generating local stiffeners at the protrusions 30.

FIG. 14 discloses a simplified cross-section of a curved composite element 14 intended to be used as fuselage element. The fuselage component may comprise a first skin plate 17 on its inner surface side and a second skin plate 23 on its outer surface side. As can be noted the first skin plate 17 comprises protrusions 30 in the longitudinal direction of the fuselage. The protrusions 30 comprise inner stiffeners on their inner surfaces. The inner stiffeners may be additional first composite layer or structures 22 laminated on the inner surface 17a of the first skin plate 17 and being bulged together with the basic composite structure 18. Inside the protrusions 30 may be void spaces 32a or the spaces may comprise light-weight material 32b. Void spaces can be filled with support tooling material during cure.

Figures 15, 16, 17:
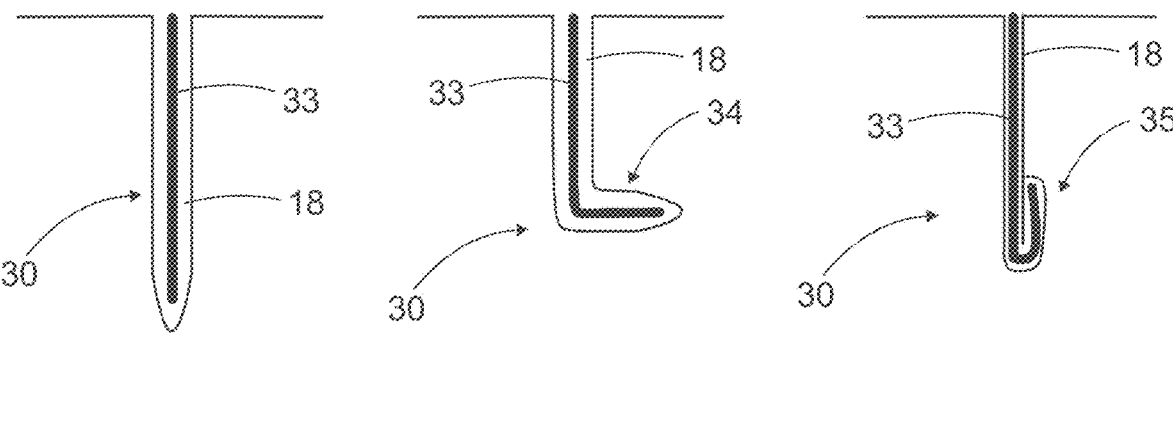
FIG. 15 is schematic view of a protrusion comprising a central inner stiffener having I-shape.
FIG. 16 is a schematic view of a protrusion comprising a transverse portion at its outer end portion.
FIG. 17 is a schematic view of a protrusion comprising an enlargement at its outer end.

FIG. 15 discloses a protrusion 30 comprising a central inner stiffener 33 having I-shape. The inner stiffener 33 may be formed by the bulging technique disclosed above, whereby it has folded double-layer structure, or alternatively, it may be formed by arranging an insert piece inside the bulge.

FIG. 16 shows a protrusion 30 comprising a transverse portion 34 at its outer end portion. The transverse portion 34 may be bent after the bulging process or during it. An end part of the protrusion 30 is bent 90°.

FIG. 17 shows a protrusion 30 comprising an enlargement or bulb 35 at its outer end. An end part of the protrusion 30 is bent 180°.

Figures 18, 19, 20:
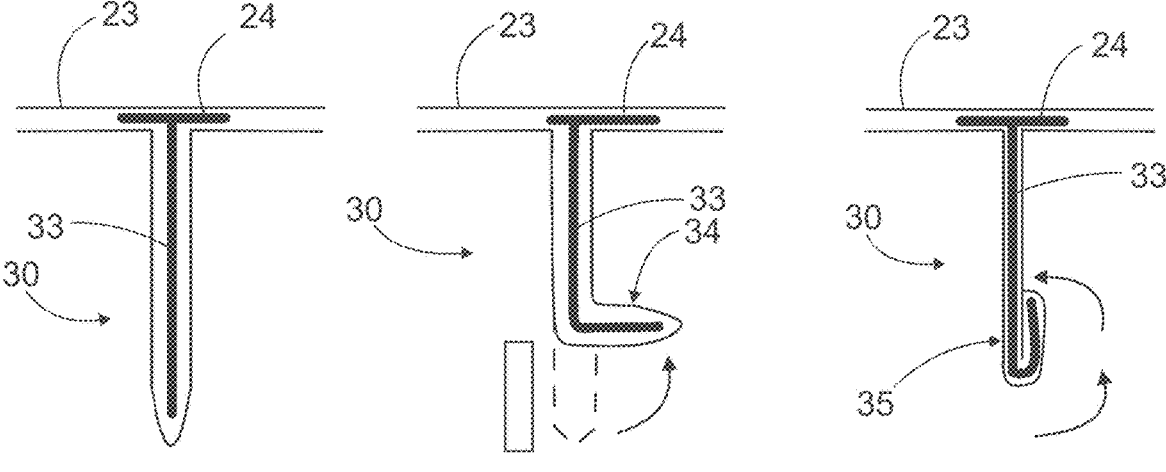
FIG. 18 is a schematic view showing that inner stiffeners of a first and second skin plate are combined and form together an inner stiffener having shape of an inverted T.
FIG. 19 is a schematic view showing that a bent inner stiffener of a first skin plate and a surface stiffener of a second skin plate are combined and form together an inner stiffener having C-shape.
FIG. 20 is a schematic view showing that an inner stiffener comprising an enlargement is combined with a surface stiffener of a second skin plate.

FIG. 18 shows that stiffeners 22, 24 of a first and second skin plate 17, 23 are combined and form together an inner stiffener 33 having shape of an inverted T.

FIG. 19 discloses bending of an end part of the protrusion 30 for forming a transverse portion 34. Further, the bent stiffener 33 of a first skin plate 17 and a surface stiffener 24 of a second skin plate 23 are combined whereby they form together an inner stiffener 33 having C-shape.

FIG. 20 shows bending of an end part of the protrusion 30 for forming an enlargement 35. FIG. 20 further shows that an inner stiffener 33 comprising the enlargement 35 is combined with a surface stiffener 24 of a second skin plate 23.

Figures 21, 22, 23, 24, 25:
FIGS. 21-25 are schematic views of an alternative solution wherein inside a protrusion is arranged a prefabricated composite profile element having T-shape.

FIGS. 21-25 show an alternative manufacturing principle for creating inner stiffeners inside the protrusions 30. At first a protrusion 30 is formed by means of bulging technique, for example. Thereafter, a composite profile 36 is inserted inside the protrusion 30, as it is shown in FIG. 22. FIG. 23 shows that the basic composite material 18 and the additional first composite layer or structure 22 are pressed towards the inserted composite profile 36 by means of pressing tools 37. Thereby the additional composite layer 22 is set against the outer surface of the composite profile 36. The composite profile 36 is thereby enveloped by the additional composite layer 22 and the basic composite structure 18, as it is shown in FIG. 24. FIG. 25 still shows that the structure may be assembled and cured by means of vacuum bagging, wherein vacuum is formed by means of a vacuum pump 37 inside a bag 41 surrounding the composed structure. The structure is simultaneously heated by means of a heating device 38. During the curing process the composed structure may be supported by means of additional mould or support pieces 39 for ensuring accuracy of the structure. The additional mould or support pieces 39 may also be used for actively shaping the shape of the protrusion. In this solution the protrusion and the inner stiffener both have shape resembling letter T.

FIGS. 26 and 27 disclose that a protrusion 30 may be provided with a composite profile element 35 having C-shape.

FIGS. 28 and 29 discloses alternative solutions wherein profile elements 36 inserted inside the protrusions 30 only serve as inner stiffeners for the protrusions 30.

Figures 30, 31, 32:
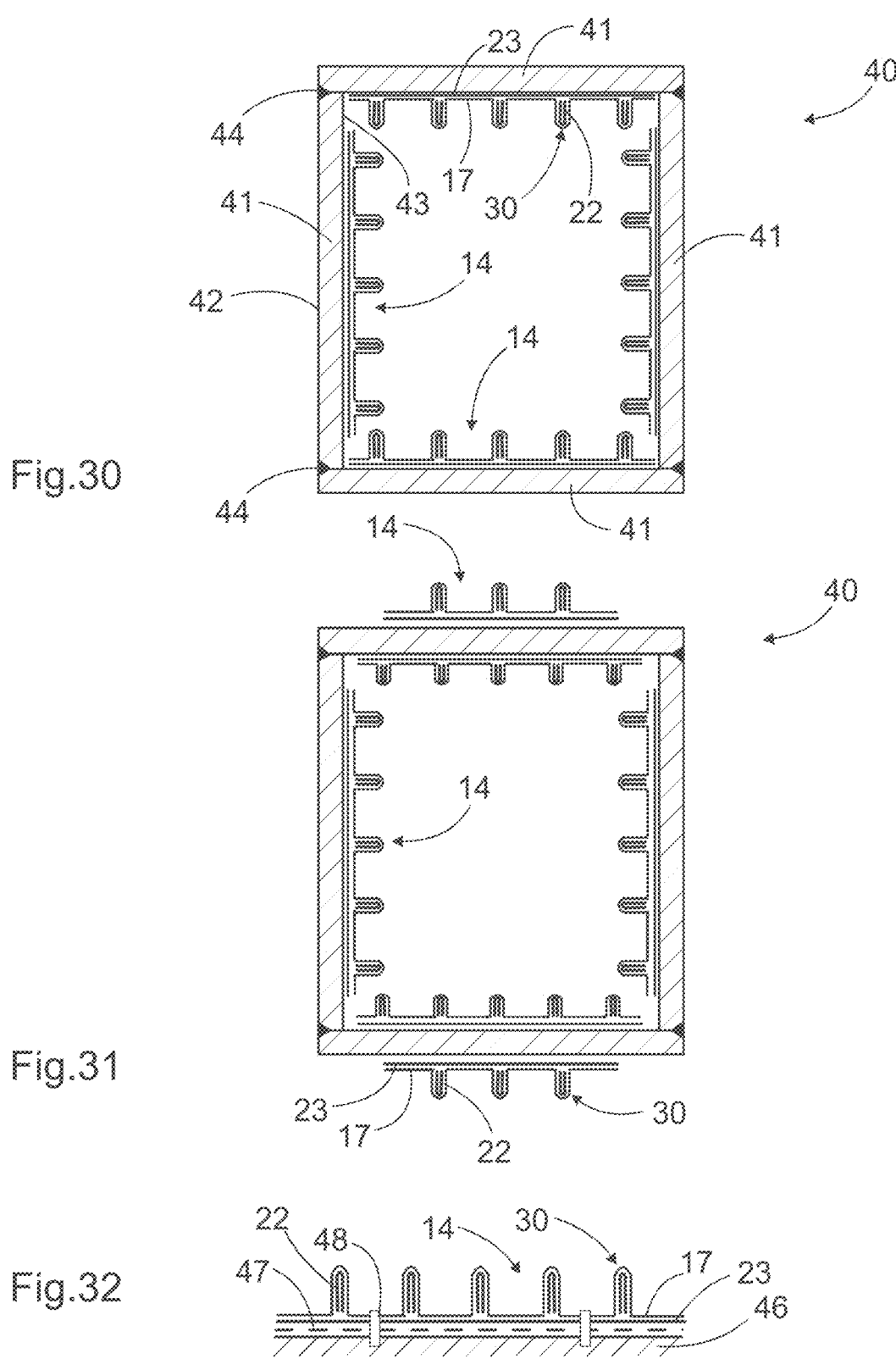
FIG. 30 is a schematic end view of a hollow beam structure provided with composite stiffening elements on inner surfaces of the beam.
FIG. 31 is a schematic end view of another hollow beam having composite stiffening elements on its inner and outer surfaces.
FIG. 32 is a schematic view of a surface of a machine component on which is fastened a composite element comprising a first skin plate provided with several protrusions and a second skin plate.

FIG. 30 discloses a hollow beam 40 or boom cross-section of which is rectangular. Thus, the beam 40 comprises four walls 41 each of them having outer surfaces 42 and inner surfaces 43. The walls 41 may be of metallic plate material and they may be fastened to each other at corners by weld joints 44, for example. In FIG. 30 the walls 41 are stiffened by mounting composite stiffening elements 14 on their inner surfaces 43. In FIG. 31 also the outer surfaces of the horizontal walls are provided with the disclosed stiffening composite elements 14. Further, as can be noted, the composite elements 14 are fastened against surfaces 42, 43 of the beam 40 via the second skin plates 23.

FIG. 32 discloses a machine component or structural element 46 on which the composite stiffening element 14 is mounted in order to make the structural element 46 stiffer. The structural element 46 may be of metallic material or any different material as the composite stiffener 14. In FIG. 32 the composite stiffener or element 14 comprises the first skin plate 17 with the protrusions 30 and the additional layers 22 at the protrusions 30. The composite stiffener or element 14 comprises the second skin plate 23 too. The second skin plate 23 of the composite stiffener 14 may be fastened to the surface of the structural element 46 by means of bonding agent 47. The fastening may also comprise mechanical fasteners 48.

Figure 33:
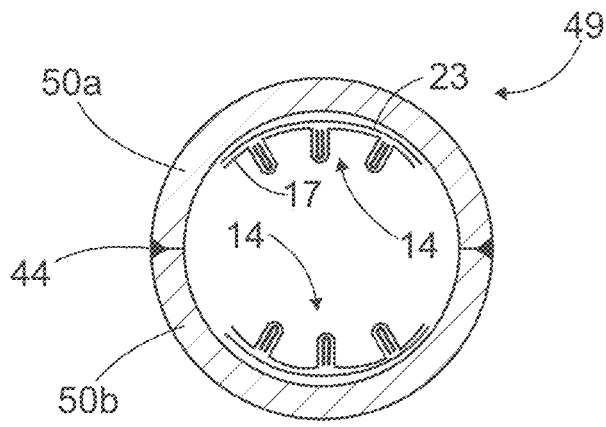
FIG. 33 is a schematic cross-sectional view of a tubular element which is made stiffer by mounting composite stiffening elements on its inner surfaces.

FIG. 33 discloses a tubular element 49, which is composed of two halves 50a, 50b. The tubular element 49 may be made of metallic material, such as steel or aluminum, or other materials like general plastics, thermoset or thermoplastic composite materials. The structure may be stiffened by means of composite stiffening elements 14 mounted against inner surfaces of the halves. In addition to round profiles, other profile shapes, such as ellipse and substantially triangular profiles, may be stiffened in the similar manner.

In some cases, features disclosed in this application may be used as such, regardless of other features. On the other hand, when necessary, features disclosed in this application may be combined in order to provide various combinations.

The drawings and the related description are only intended to illustrate the idea of the invention. Details of the invention may vary within the scope of the claims.

What is claimed is:

1. A method of manufacturing a composite element, wherein the method comprises:
   forming a first skin plate and a second skin plate of composite material both comprising at least one binder material and at least one reinforcing material and said first skin plate and second skin plate being planar elements;
   arranging several local first additional composite structures on an inner surface of the first skin plate, wherein the local first additional composite structures are planar material layers whereby the inner surface comprises integrated additional structures at a distance from each other;

bulging the first skin plate locally towards an outer surface side at the locations of first additional composite structures for forming protrusions on the side of the outer surface;

attaching the inner surface of the first skin plate permanently against the second skin plate; and curing the composed structure;

wherein the method further comprises forming the first skin plate and the second skin plate by laminating technique;

laminating the first additional composite structures on the inner surface of the first skin plate thereby forming local stiffeners; and bulging, after forming the local stiffeners, the composite structure of the first skin plate and the first additional composite structures attached on an inner surface of the first skin plate together at the protrusions, wherein the protrusions are formed by simultaneous deformation of both the composite structure of the first skin plate and the laminated first additional composite structures.

2. The method according to claim 1, comprising:

compressing the bulged protrusions in a direction that is transverse relative to central axes and to heights of the protrusions for setting surfaces of the bulged first additional structures against each other at the protrusions.

3. The method according to claim 1, comprising:

shaping the formed protrusions of the first skin plate additionally by providing the protrusions with one or more bent portions.

4. The method according to claim 1, comprising:

inserting a prefabricated composite profile inside each of the bulged protrusions of the first skin plate; and pressing the composite structure of the first skin plate and the additional first composite structure together towards the inserted composite profile, whereby the component structure of the protrusion and the inner stiffener formed by the additional first composite structure are both shaped in accordance with the shape of the inserted composite profile.

5. The method as claimed in claim 1, comprising:

forming a multi-material structure by mounting the outer surface of the second skin plate permanently against a third skin plate or surface made of material other than the composite material.

6. The method of claim 1, wherein the bulging is performed by:

positioning the first skin plate over a gap between movable mold elements of a mold arrangement;

fastening the first skin plate immovable on the mold arrangement;

heating the fastened first skin plate; and moving the mold elements towards each other for bulging the heated first skin plate to the outer surface side at the gap.

\* \* \* \* \*